US009817400B1

(12) United States Patent
Poeppel et al.

(10) Patent No.: US 9,817,400 B1
(45) Date of Patent: Nov. 14, 2017

(54) VEHICLE SERVICING SYSTEM

(71) Applicant: Uber Technologies, Inc., San Francisco, CA (US)

(72) Inventors: Scott Poeppel, Pittsburgh, PA (US); Nicholas G. Letwin, Pittsburgh, PA (US); Sean J. Kelly, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 15/378,894

(22) Filed: Dec. 14, 2016

(51) Int. Cl.
G01C 22/00 (2006.01)
G05D 1/00 (2006.01)
G05D 1/02 (2006.01)
G07C 5/00 (2006.01)
H04L 29/08 (2006.01)
G08G 1/00 (2006.01)

(52) U.S. Cl.
CPC ......... *G05D 1/0088* (2013.01); *G05D 1/0287* (2013.01); *G07C 5/006* (2013.01); *H04L 67/306* (2013.01); *G08G 1/202* (2013.01)

(58) Field of Classification Search
CPC .. G05D 1/0088; G05D 1/0287; G05D 1/0214; G05D 1/021; G05D 1/0212; G05D 1/0011; G05D 1/0061; G05D 1/0227; G05D 1/0274; G05D 1/202; G05D 1/0291; G07C 5/006; G01C 21/34; H04L 67/306; G06Q 10/02; G08G 1/147; G08G 1/16
See application file for complete search history.

(56) References Cited

U.S. PATENT DOCUMENTS

| | | | |
|---|---|---|---|
| 2010/0256836 A1* | 10/2010 | Mudalige | G08G 1/163 701/2 |
| 2015/0142244 A1 | 5/2015 | You et al. | |
| 2015/0178998 A1* | 6/2015 | Attard | G07C 5/0808 701/23 |
| 2015/0248131 A1* | 9/2015 | Fairfield | G05D 1/0044 701/2 |
| 2015/0339928 A1 | 11/2015 | Ramanujam | |
| 2015/0348335 A1* | 12/2015 | Ramanujam | G07C 5/006 701/23 |
| 2016/0116293 A1* | 4/2016 | Grover | G01C 21/34 701/23 |
| 2016/0117610 A1* | 4/2016 | Ikeda | G06Q 50/32 705/5 |
| 2016/0318516 A1* | 11/2016 | Tuukkanen | B60W 30/09 |

* cited by examiner

*Primary Examiner* — Rachid Bendidi
(74) *Attorney, Agent, or Firm* — Dority & Manning, P.A.

(57) ABSTRACT

Systems and methods for addressing a user-reported vehicle condition are provided. In one example embodiment, a method includes receiving a service request for a vehicle service for a user. The service request is indicative of a location associated with the user. The method includes sending first control signal(s) to an autonomous vehicle that is configured to provide the vehicle service. The first control signal(s) indicate that the autonomous vehicle is to travel to the location associated with the user. The method includes receiving a communication indicative of an existence of a condition that reduces a suitability of the autonomous vehicle to provide the vehicle service. The condition is identified by the user. The method includes determining action(s) to be performed by the autonomous vehicle based, at least in part, on the existence of the condition. The method includes sending second control signal(s) to the autonomous vehicle to perform the action(s).

20 Claims, 6 Drawing Sheets

200

| ORDER | VEHICLES |
|---|---|
| (1) | VEHICLE ID #1 — 202A |
| (2) | VEHICLE ID #2 — 202B |
| (3) | VEHICLE ID #3 — 202C |
| (4) | . . . |

| ORDER | USERS |
|---|---|
| (1) | USER ID #1 — 204A |
| (2) | USER ID #2 — 204B |
| (3) | USER ID #3 — 204C |
| (4) | . . . |

| ORDER | VEHICLES |
|---|---|
| (1) | VEHICLE ID #3 — 202C |
| (2) | VEHICLE ID #4 |
| (3) | VEHICLE ID #5 |
| (4) | . . . |

| ORDER | USERS |
|---|---|
| (1) | USER ID #1 — 204A |
| (2) | USER ID #3 — 204C |
| (3) | USER ID #4 |
| (4) | . . . |

FIG. 5

VEHICLE SERVICING SYSTEM

FIELD

The present disclosure relates generally to addressing user reported conditions of an autonomous vehicle.

BACKGROUND

An autonomous vehicle can perceive its surroundings by using various sensor apparatuses and determining its position on the basis of the information associated with its surroundings. This can allow an autonomous vehicle to navigate without human intervention and, in some cases, even omit the use of a human driver altogether. However, the lack of in-person human oversight can potentially reduce the opportunity to recognize problems associated with the autonomous vehicle.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of addressing a user-reported vehicle condition. The method includes receiving, by one or more computing devices, a service request for a vehicle service for a user. The service request is indicative of a location. The method includes sending, by the one or more computing devices, one or more first control signals to an autonomous vehicle that is configured to provide the vehicle service. One or more of the first control signals indicate that the autonomous vehicle is to travel to the location. The method includes receiving, by the one or more computing devices from a user device, a communication indicative of an existence of a condition associated with the autonomous vehicle that reduces a suitability of the autonomous vehicle to provide the vehicle service. The condition is identified by the user. The method includes determining, by the one or more computing devices, one or more actions to be performed by the autonomous vehicle based, at least in part, on the existence of the condition associated with the autonomous vehicle. The method includes sending, by the one or more computing devices, one or more second control signals to the autonomous vehicle to perform one or more of the actions.

Another example aspect of the present disclosure is directed to a system for addressing a user-reported vehicle condition. The system includes one or more processors; and one or more memory devices, the one or more memory devices storing instructions that when executed by the one or more processors cause the one or more processors to perform operations. The operations include receiving a service request for a vehicle service. The service request is indicative of a location. The operations include identifying an autonomous vehicle to provide the vehicle service. The operations include sending one or more first control signals to the autonomous vehicle indicating that the autonomous vehicle is to travel to the location. The operations include receiving, from a user device, a communication indicative of an existence of a condition associated with the autonomous vehicle. The condition reduces a suitability of the autonomous vehicle to provide the vehicle service. The condition is identified by a user. The operations include determining one or more actions to be performed by the autonomous vehicle based, at least in part, on the existence of the condition associated with the autonomous vehicle. The operations include sending one or more second control signals to the autonomous vehicle to perform one or more of the actions.

Yet another example aspect of the present disclosure is directed to one or more tangible, non-transitory computer-readable media storing computer-readable instructions that when executed by one or more processors cause the one or more processors to perform operations. The operations include receiving a service request for a vehicle service for a user. The operations include identifying an autonomous vehicle to provide the vehicle service to the user. The autonomous vehicle is included in a fleet of vehicles of a service provider. The operations include receiving, from a user device, a communication indicative of an existence of an adverse condition associated with the autonomous vehicle. The condition is identified by the user. The operations include determining one or more actions to be performed by the autonomous vehicle based, at least in part, on the existence of the adverse condition associated with the autonomous vehicle. The operations include sending one or more control signals to the autonomous vehicle to perform one or more of the actions.

Other example aspects of the present disclosure are directed to systems, methods, vehicles, apparatuses, tangible, non-transitory computer-readable media, user interfaces, and memory devices for addressing a user-reported vehicle condition.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example service queue according to example embodiments of the present disclosure;

FIG. 5 depicts an example adjusted service queue according to example embodiments of the present disclosure;

DETAILED DESCRIPTION

Figure 1:
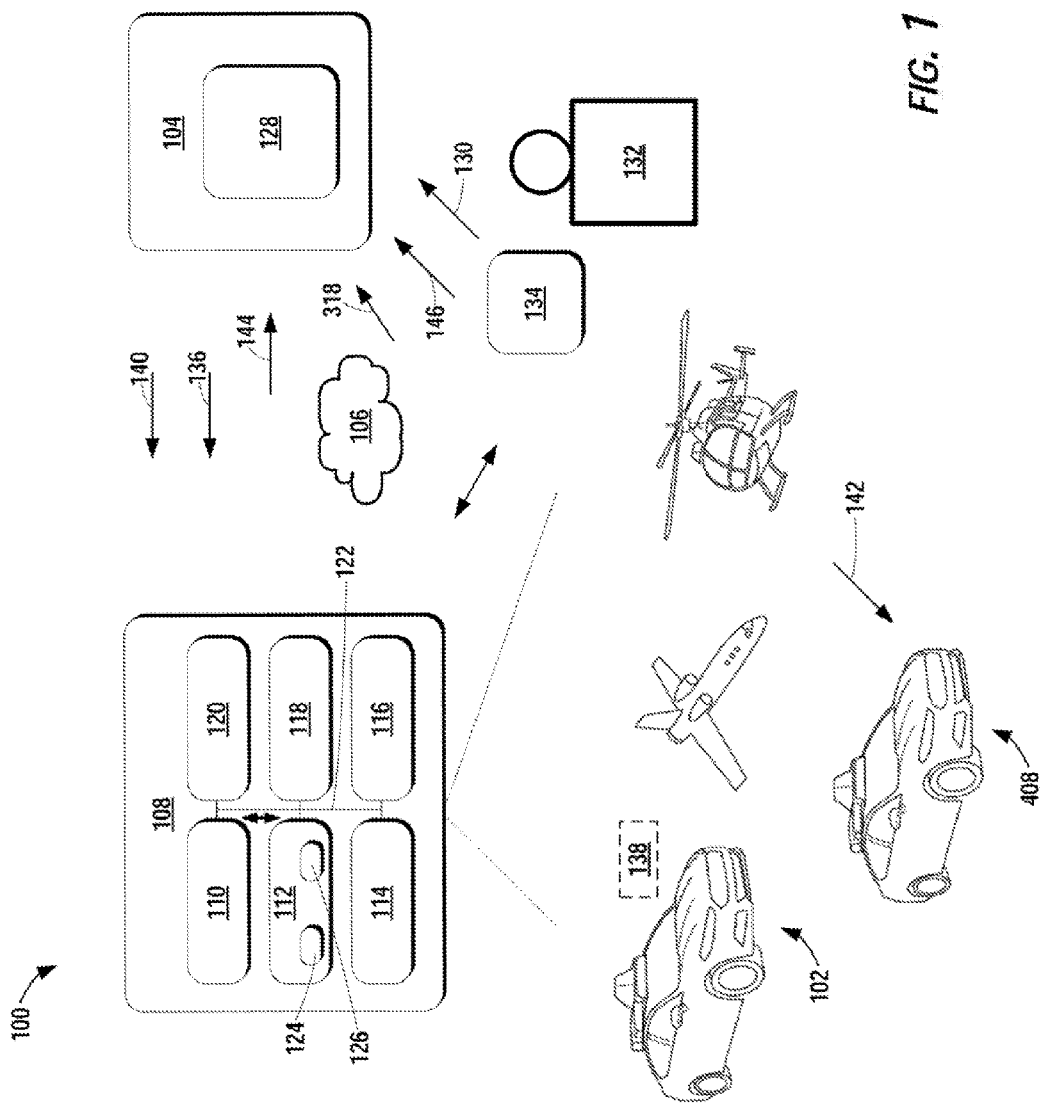
FIG. 1 depicts an example system for addressing a user-reported vehicle condition according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to addressing an adverse condition of an autonomous vehicle that is reported by a user. For instance, a service provider can use a fleet of vehicles to provide a vehicle service to a plurality of users. The fleet can include, for example, autonomous vehicles that can drive, navigate, operate, etc. with minimal and/or no interaction from a human driver, as will be further described herein. The service provider can coordinate the autonomous vehicles to provide the vehicle services of the service provider (e.g., transportation, courier, delivery) via an operations computing system. For example, the operations computing system can receive a service request (e.g., for transportation) for a user and select an autonomous vehicle to provide the vehicle service to the user. When the autonomous vehicle arrives at the user's location, the user may notice an adverse condition associated with the vehicle. For example, the user may notice that the vehicle is dirty, damaged, and/or otherwise less (or not) suitable to provide the transportation services to the user. The user can notify the service provider of the vehicle's condition by sending a communication (e.g., via the user's mobile phone) to the operations computing system. The operations computing system can determine one or more action(s) to be taken by the vehicle based, at least in part, on the existence of the condition. For example, if the vehicle is too dirty for the user to ride in the vehicle, the user can reject the vehicle and the operations computing system can send a control signal to cause the vehicle to travel to a maintenance location for cleaning. Moreover, the operations computing system can coordinate another autonomous vehicle to provide the vehicle service to the user (e.g., to transport the user). In this way, the operations computing system can address adverse conditions of an autonomous vehicle that are identified and/or reported by a user.

More particularly, a service provider can use a fleet of vehicles (e.g., ground-based vehicles, aircrafts) to provide a vehicle service such as a transportation service (e.g., rideshare service), a courier service, a delivery service, etc. The fleet can include autonomous vehicles configured to operate in one or more mode(s). For example, an autonomous vehicle can operate in a fully autonomous (e.g., self-driving) operational mode in which the autonomous vehicle can provide driving and navigational operation with minimal and/or no interaction from a human driver present in the vehicle. The autonomous vehicles can be configured to provide the vehicle services of the service provider.

The service provider can utilize an operations computing system to coordinate the fleet of vehicles to provide the vehicle services to a plurality of users. The operations computing system (e.g., a cloud-based server system) can be configured to communicate with the computing devices of the vehicle and/or the users (e.g., user devices). For instance, the operations computing system can receive a service request for a vehicle service (e.g., transportation) for a user. The service request can be indicative of a location associated with the user (e.g., a pick-up location). The operations computing system can identify an autonomous vehicle to provide the vehicle service to the user. This can be done based, at least in part, on one or more service queue(s) that can be utilized to match available vehicles with requesting users. This can also be done based, at least in part, on vehicle location. The operations computing system can send one or more control signal(s) indicating that the autonomous vehicle is to travel to the location associated with the user. As such, the vehicle can travel to the user's location to provide the vehicle service to the user (e.g., to pick-up the user for transportation).

The user can identify a condition associated with the autonomous vehicle. The condition can be an adverse condition that reduces a suitability of the autonomous vehicle to provide a vehicle service to the user. For instance, the condition can alter the appropriateness, ability, capability, state, performance, etc. of the autonomous vehicle to provide the vehicle services to the user and/or can affect (e.g., negatively) the user's experience with the vehicle. The user may identify the condition before and/or after entering the vehicle or receiving a vehicle service from the vehicle (e.g., while riding in the vehicle). In some implementations, the condition can be severe, rendering the autonomous vehicle unsuitable to provide the vehicle service to the user. For example, before entering the vehicle, the user may identify that the interior of the autonomous vehicle is very unclean to the point that the user would not be willing to ride in the vehicle. In some implementations, the condition can be less severe, reducing (but not eliminating) the vehicle's suitability to provide the vehicle service to the user. For example, while riding in the vehicle, the user may identify that a window of the vehicle is cracked. The user can provide user input to a user device (e.g., a mobile phone of the user, a tablet of the vehicle) indicating the existence of the condition. The user device can provide a communication indicative of the existence of the condition to the operations computing system.

The operations computing system can receive the communication and determine one or more action(s) to be taken by the vehicle based, at least in part, on the existence of the condition. At least some of the action(s) can attempt to alleviate the condition identified by the user. The operations computing system can send control signals to cause the autonomous vehicle to perform the action(s). For example, in the event of a severe condition (e.g., very unclean interior) the user can reject the autonomous vehicle from providing a vehicle service to the user. The operations computing system can send one or more control signal(s) to the autonomous vehicle to travel to a maintenance location (e.g., service depot) for cleaning. The operations computing system can also cause another autonomous vehicle to travel to the user's location to provide vehicle services to the user (e.g., to transport the user). In the event that the condition is less severe, the vehicle may be able to provide the vehicle service to the user and, afterwards, address the condition. In such a case, the operations computing system can send control signal(s) to cause the autonomous vehicle to provide (and/or to continue providing) the vehicle services to the user and, then, travel to a maintenance location after completion of the services (e.g., dropping-off the user at a destination location). The operations computing system can provide the user with a discount on the cost of the vehicle services due to the existence of the condition (e.g., cracked window).

In some implementations, the operations computing system can determine the action(s) based, at least in part, on a current demand for the vehicle services. For example, the operations computing system can determine a current demand based, at least in part, on a volume of current service requests and/or other factors. As will be further described herein, if the demand for the vehicle services outweighs the severity of the condition (e.g., a cracked window), the operations computing system can leave the autonomous vehicle in a service queue (and/or a pool of available vehicles) such that it will continue to provide vehicle services to requesting users, despite the existence of the condition. Once demand has subsided, the vehicle can then travel to a maintenance location.

In some implementations, the operations computing system can be configured to confirm the existence of the condition. For instance, the operations computing system can receive data (e.g., image data) indicative of the condition (e.g., the dirty vehicle interior) from the vehicle's on-board computing system. Such data can be acquired via one or more system(s) on-board the autonomous vehicle (e.g., image capture devices). Additionally, or alternatively, the operations computing system can receive data (e.g., image data) indicative of the condition from a user device (e.g., the user's mobile phone). The operations computing system can process the data provided by the user device and confirm the existence of the condition. In this way, the operations computing system can filter out false user reports and/or avoid unnecessarily taking an autonomous vehicle out-of-service (e.g., by sending it to a maintenance location).

The operations computing system can reward users for reporting conditions associated with the vehicle and/or penalize users providing false reports. For instance, in the event the operations computing system confirms that the condition does exist (e.g., a window is cracked) the operations computing system can apply a reward (e.g., increase user rating, monetary discount) to a profile associated with the user that reported the condition. In the event the operations computing system determines that the condition does not exist (e.g., the window is not cracked), the operations computing system can apply a penalty (e.g., decrease user rating, monetary fine) to a profile associated with the user that falsely reported the condition. In some implementations, the user that caused the condition may be penalized. As such, the operations computing system can incentivize accurate reporting of vehicle conditions and disincentivize false reporting.

The systems and methods described herein provide a number of technical effects and benefits. For instance, by using its network of service users to report vehicle conditions, the operations computing systems can save valuable resources that would otherwise be used for coordinating and deploying maintenance/servicing teams to continuously examine the vehicles. Moreover, the operations computing system can reduce the frequency with which the vehicles must travel to maintenance locations for examination. Instead, such maintenance trips can be dedicated to addressing reported conditions and/or scheduled maintenance, which is easier to coordinate and more predictable for the operations computing system. This can allow more appropriate determinations as to when to remove a vehicle from a service queue (e.g., to receive maintenance) and/or to bring another autonomous vehicle online to provide vehicle services to the users. Moreover, by reducing the need for maintenance team deployment and/or reducing the frequency of maintenance trips, the systems and methods can limit the allocation of processing and storage resources that are required for such deployment/coordination. The saved resources can be allocated to other functions of the operations computing systems, such as the processing of service requests, generating user interfaces, vehicle routing, etc. In this way, the systems and methods according to example aspects of the present disclosure have a technical effect of providing a computationally efficient approach to addressing vehicle problems while saving computational resources for other, more core functions of the operations computing system.

The systems and methods of the present disclosure also provide an improvement to vehicle computing technology, such as autonomous vehicle computing technology. For instance, the systems and methods can allow for receiving a service request for a vehicle service (e.g., indicating a user location), identifying an autonomous vehicle to provide the vehicle service, sending control signals to the autonomous vehicle indicating that the autonomous vehicle is to travel to the location, and receiving, from a user device, a communication indicative of an existence of a condition associated with the autonomous vehicle. As indicated herein, the condition is identified by a user and the condition can reduce a suitability of the autonomous vehicle to provide the vehicle service (e.g., to the user). The systems and methods can allow for determining one or more action(s) to be performed by the autonomous vehicle based, at least in part, on the existence of the condition associated with the autonomous vehicle and sending one or more control signal(s) to the autonomous vehicle to perform one or more of the action(s). As such, the systems and methods enable the vehicle technology to leverage the functions of the operations computing system to determine and address adverse conditions of the autonomous vehicle that may not otherwise be detected by the vehicle computing technology. Thus, the systems and methods can allow an autonomous vehicle to address adverse conditions without adding more complex, expensive, and computationally demanding monitoring hardware to the vehicle's computing system. The vehicle can save computational resources (e.g., processing, data storage) that may otherwise be used for operating the more robust monitoring equipment and/or more frequently traveling to maintenance locations for vehicle examination. Accordingly, the saved processing and storage resources of the vehicle can be consumed for more critical, core functions of the vehicle such as imaging, object detection, autonomous navigation, etc.

With reference now to the FIGS., example embodiments of the present disclosure will be discussed in further detail. FIG. 1 depicts an example system 100 according to example embodiments of the present disclosure. The system 100 can include a vehicle 102 and an operations computing system 104. The vehicle 102 can communicate with the operations computing system 104 via one or more communications network(s) 106. The communications network(s) 106 can include various wired and/or wireless communication mechanisms (e.g., cellular, wireless, satellite, microwave, and/or radio frequency) and/or any desired network topology (or topologies). For example, the network(s) 106 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

The vehicle 102 can be a ground-based vehicle (e.g., an automobile), an aircraft, and/or another type of vehicle. The vehicle 102 can be an autonomous vehicle that can drive, navigate, operate, etc. with minimal and/or no interaction from a human driver. The autonomous vehicle 102 can be configured to operate in one or more mode(s) such as, for example, a fully autonomous operational mode, a semi-autonomous operational mode, a park mode, a sleep mode, etc. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 waits to provide a subsequent vehicle service, recharges between operational modes, etc.

The vehicle 102 can include a vehicle computing system 108. The vehicle computing system 108 can include various components for performing various operations and functions. For example, the vehicle computing system 108 can include one or more computing device(s) on-board the vehicle 102. The computing device(s) can include one or more processor(s) and one or more memory device(s), each of which are on-board the vehicle 102. The computing device(s) can implement, include, and/or otherwise be associated with various systems on-board the vehicle 102. For instance, the vehicle computing system 108 can include one or more control system(s) 110, one or more data acquisition system(s) 112, an autonomy system 114 (e.g., including a navigation system), one or more human machine interface system(s) 116, other vehicle systems 118, and/or a communications system 120. At least a subset of the system(s) on-board the vehicle 102 can be configured to communicate with one another via a network 122. The network 122 can include one or more data bus(es) (e.g., controller area network (CAN)), on-board diagnostics connector (e.g., OBD-II), and/or a combination of wired and/or wireless communication links. The on-board systems can send and/or receive data, messages, signals, etc. amongst one another via the network 122.

The one or more control system(s) 110 of the vehicle 102 can be configured to control one or more features(s) of the vehicle 102. For example, the control system(s) 110 can be configured to control the motion of the vehicle 102 such as, for example, acceleration, speed, steering, braking, turn signals, departure, take-off, lift-off, return (e.g., landing), parking, etc. The control system(s) 110 can be configured to control one or more other feature(s) of the vehicle 102 such as the gears, status of drive, engine, AC system, lights, turn signals, sound system, microphone, etc. In some implementations, the control system(s) 110 can be configured to control one or more access point(s) of the vehicle 102. The access point(s) can include features such as the vehicle's door locks, trunk lock, hood lock, fuel tank access, latches, and/or other mechanical access features that can be adjusted between one or more state(s), position(s), location(s), etc. For example, the control system(s) 110 can be configured to control an access point (e.g., door lock) to adjust the access point between a first state (e.g., lock position) and a second state (e.g., unlocked position). The control system(s) 110 can also be configured to receive control signals that are indicative of the parameter(s) at which the features and/or access points of the vehicle 102 are to operate.

The data acquisition systems 112 can include various devices configured to acquire data associated with the vehicle 102. This can include data associated with one or more of the vehicle's system(s) (e.g., health data), the vehicle's interior, the vehicle's exterior, the vehicle's surroundings, the vehicle users, etc. The data acquisition systems 112 can include, for example, one or more image capture device(s) 124. The image capture device(s) 124 can include one or more camera(s), light detection and ranging (or radar) device(s) (LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The image capture device(s) 124 can be located in the interior and/or on the exterior of the vehicle 102. The one or more image capture device(s) 124 can be configured to acquire image data to be used for operation of the vehicle 102 in an autonomous mode. For example, the image capture device(s) 124 can acquire image data to allow the vehicle 102 to implement one or more machine vision technique(s) (e.g., to detect objects in the surrounding environment).

Additionally, or alternatively, the data acquisition systems 112 can include one or more sensor(s) 126. The sensor(s) 126 can include impact sensors, motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameter(s) associated with the vehicle 102 and/or relevant to the operation of the vehicle 102. The data acquisition systems 112 can include one or more sensor(s) 126 dedicated to obtaining data associated with a particular aspect of the vehicle 102, such as, the vehicle's fuel tank, engine, oil compartment, wipers, etc. The sensor(s) 126 can also, or alternatively, include sensor(s) associated with one or more mechanical and/or electrical components of the vehicle 102. For example, one or more of the sensor(s) 126 can be configured to detect whether a vehicle door, trunk, gas cap, etc. is in an open or closed position. In some implementations, the data acquired by the sensor(s) 126 can help detect other vehicles and/or objects, road conditions (e.g., curves, potholes, dips, bumps, changes in grade), measure a distance between the vehicle 102 and the other vehicles and/or objects, etc.

The vehicle computing system 108 can also be configured to obtain map data. For instance, a computing device of the vehicle 102 (e.g., within the autonomy system 114) can be configured to receive map data from one or more remote computing device(s). This can include computing device(s) of the operations computing system 104 and/or one or more other remote computing device(s) (e.g., associated with a geographic mapping service provider). The map data can include two-dimensional and/or three-dimensional geographic map data associated with the area in which the vehicle was, is, intends to, and/or will be travelling. The data acquired from the data acquisition system(s) 112, the map data, and/or other data can be stored in one or more memory device(s) on-board the vehicle 102.

The autonomy system 114 can be configured to allow the vehicle 102 to operate in an autonomous mode. For instance, the autonomy system 114 can obtain the data associated with the vehicle 102 (e.g., acquired by the data acquisition systems 112). The autonomy system 114 can also obtain the map data. The autonomy system 114 can control various functions of the vehicle 102 based, at least in part, on the acquired data associated with the vehicle 102 and/or the map data to implement the autonomous mode. For example, the autonomy system 114 can include various models to perceive road features, signage, and/or objects, people, animals, etc. based, at least in part, on the data acquired by the data acquisition system(s) 112, map data, and/or other data. In some implementations, the autonomy system 114 can include machine-learned models that use the data acquired by the data acquisition system(s) 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 102 and other vehicles or objects, etc. The autonomy system 114 can be configured to predict the position and/or movement (or lack thereof) of such elements (e.g., using one or more odometry techniques). The autonomy system 114 can be configured to plan the motion of the vehicle 102 based, at least in part, on such predictions. The autonomy system 114 can implement the planned motion to appropriately navigate the vehicle 102 with minimal or no human intervention. For instance, the autonomy system 114 can include a navigation system configured to direct the vehicle 102 to a destination location. The autonomy system 114 can send signals to the control system(s) 110 to regulate vehicle speed, acceleration, deceleration, steering, and/or operation of other components to operate in an autonomous mode to travel to such a destination location.

The human machine interface system(s) 116 can be configured to allow interaction between a user (e.g., human), the vehicle 102 (e.g., the vehicle computing system 108), and/or a third party (e.g., an operator associated with the service provider). The human machine interface system(s) 116 can include a variety of interfaces for the user to input and/or receive information from the vehicle computing system 108. For example, the human machine interface system(s) 116 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The human machine interface system(s) 116 can include one or more input device(s) (e.g., touchscreens, keypad, touchpad, knobs, buttons, sliders, switches, mouse, gyroscope, microphone, other hardware interfaces) configured to receive user input. The human machine interface(s) 116 can also include one or more output device(s) (e.g., display devices, speakers, lights) to receive and output data associated with the interfaces. As will be further described herein, the human-machine interface systems can include and/or be associated with one or more user device(s) of the vehicle 102 (e.g., a tablet within the interior of the vehicle 102 that is connected to the vehicle 102).

The other vehicle systems 118 can be configured to control and/or monitor other aspects of the vehicle 102. For instance, the other vehicle systems 118 can include software update monitors, an engine control unit, transmission control unit, the on-board memory devices, etc. By way of example, the software update monitors can provide data indicative of a current status of the software running on one or more of the on-board system(s) and/or whether the respective system requires a software update.

The communications system 120 can be configured to allow the vehicle computing system 108 (and its subsystems) to communicate with other computing devices. In some implementations, the vehicle computing system 108 can use the communications system 120 to communicate with one or more remote computing device(s) that are remote from the vehicle 102, such as those of the operations computing system 104 (e.g., over the network(s) 106 via wireless connections). The communications system 120 can include any suitable components for interfacing with one or more network(s), including for example, transmitters, receivers, ports, controllers, antennas, or other suitable components that can help facilitate communication with one or more computing device(s).

The operations computing system 104 can be associated with a service provider that provides one or more vehicle service(s) to a plurality of users via a fleet of vehicles that includes, for example, the vehicle 102. The service provider can be an entity that organizes, coordinates, manages, etc. one or more vehicle service(s) for users. The vehicle service(s) can include transportation services (e.g., rideshare services), courier services, delivery services, and/or other types of services. The vehicle 102 (and others in the fleet) can be configured to provide the vehicle service(s) to the users. A user can be a user that has downloaded a software application associated with the service provider, a user that has made a service request with the service provider, a user that is a customer of the service provider, a user that has registered with (e.g., signed-up with, has an account with, has a profile with, has subscribed to) the service provider, a current user of the vehicle, a potential user of the vehicle, a user that has been paired with the vehicle, etc. The service provider can coordinate a plurality of vehicles, including the vehicle 102, to provide the vehicle service(s) to a plurality of users. Such coordination can be performed via the operations computing system 104.

The operations computing system 104 can include multiple components for performing various operations and functions. For example, the operations computing system 104 can include and/or otherwise be associated with one or more computing device(s) 128 that are remote from the vehicle 102. The one or more computing device(s) 128 can include one or more processor(s) and one or more memory device(s). The one or more memory device(s) can store instructions that when executed by the one or more processor(s) cause the one or more processor(s) to perform operations and functions, such as those for addressing a user-reported vehicle condition. For example, the computing device(s) 128 can be configured to monitor and communicate with the vehicle 102 and/or its users to coordinate a vehicle service provided by the vehicle 102.

The computing device(s) 128 can receive a service request 130 for a vehicle service. For example, a user 132 can operate a user device 134 to generate and transmit a service request 130 (e.g., for transportation services) to the computing device(s) 128. In some implementations, the user device 134 can include a software application associated with the service provider via which the user 132 can provide the service request 130 for a vehicle service. In some implementations, the user 132 can interact with a user interface provided by the software application to specify a service type, a vehicle type, one or more location(s) (e.g., origin, destination), etc. and select one or more element(s) to cause the software application to generate and transmit the service request 130.

The service request 130 can include a variety of information associated with the user 132, the requested vehicle service, and/or the vehicle. For instance, the service request 130 can be indicative of the user 132 associated with the service request 130. By way of example, the service request 130 can include an ID associated with an account and/or profile of the user 132 and/or the user device 134 associated with the user 132 (e.g., a user name, user ID, a hash of the user name and/or user ID, an ID corresponding to the user device). The service request 130 can also be indicative of one or more location(s). For example, the service request 130 can be indicative of an origin location (e.g., pick-up location for transport, courier), a destination location, a delivery location, etc. The service request 130 can be indicative of a location associated with the user 132 (e.g., that provided the service request 130 via the user device 134). A location can be indicated as a location data point (e.g., such as a latitude and a longitude), a semantic location (e.g., "City A Natural History Museum"), and/or another type of identifier. For example, a pick-up location can correspond to a current location of the user device 134 that is determined by a global positioning system (GPS) resource of the user device 134. The user device 134 (and/or a software application) can receive the current location and include the current location as a location in the service request 130. The service request 130 can also include other information such as a service type (e.g., indicating the type of vehicle service being requested), a vehicle type information (e.g., indicating what type of vehicle is preferred), and/or a payment identifier (e.g., associated with a user account and/or profile).

The computing device(s) 128 of the operation computing system can identify a vehicle to provide the vehicle service requested by the service request 130. To do so, the computing device(s) 128 can manage a service queue to provide the user 132 with one or more vehicle service(s) of the service provider. For instance, FIG. 2 depicts an example service queue 200 according to example embodiments of the present disclosure. The vehicle 102 can be included in a plurality of vehicles (e.g., a fleet of vehicles) associated with the service provider. Each vehicle in the plurality of vehicles can be configured to provide the vehicle services of the service provider. The service queue 200 can identify at least a subset of the plurality of vehicles associated with the service provider that are available to provide the vehicle service. For example, the vehicles in the service queue 200 can be identified by an identifier 202A-C associated with the respective vehicle. The queue can also include identifiers 204A-C associated with the respective users (e.g., that are requesting service). This can be indicative of a currently pending volume of service requests. The service queue 200 can include a data structure which can be stored in a medium such as a cache and/or other memory resource. The service queue 200 can be an aggregation of data items, some of which can be used to identify a particular vehicle that is available to provide a vehicle service.

A selection process can be associated with the service queue 200 in order to pair one or more user(s) with a vehicle that can provide the vehicle service requested by the user(s). The selection process can be based, at least in part, on one or more factor(s). The factor(s) can include vehicle availability, user location, vehicle location, service type, vehicle type, user rating, vehicle rating, other information indicated in the service request 130, and/or other factors. The computing device(s) 128 can assign a vehicle to a user based, at least in part, on the selection process. For example, the computing device(s) 128 can select vehicle 102 (e.g., associated with identifier 202A) to provide the requested vehicle service for user 132 (e.g., associated with identifier 204A).

Returning to FIG. 1, the computing device(s) 128 of the operations computing system 104 can instruct the vehicle 102 to provide the requested vehicle services. For instance, the computing device(s) 128 can send one or more first control signal(s) 136 to the vehicle 102 indicating that the vehicle 102 is to travel to a location (e.g., indicated in the service request 130, associated with the user 132). The first control signal(s) 136 can be provided to the vehicle 102 via one or more of the network(s) 106. The first control signal(s) 136 can indicate one or more of a location to which the vehicle 102 is to travel (e.g., the location of the user), the type of vehicle service to be provided, a destination location (e.g., to where the user 132 is to be transported), etc. The vehicle computing system 108 can receive the first control signal(s) 136 (e.g., via the communication system(s) 120). The vehicle computing system 108 can process the first control signal(s) 136 to determine what the vehicle 102 is to do in response thereto. The vehicle computing system 108 can then cause the vehicle 102 to act in accordance with the first control signal(s) 136. For example, the autonomy system 114 and/or the control systems 110 can cause the vehicle 102 to travel to a location associated with the user 132 (and/or indicated in the service request 130) to provide the vehicle services to the user (e.g., pick-up the user for transportation).

A user can identify a condition 138 associated with the vehicle 102. The user that identifies the condition 138 associated with the vehicle 102 can be the user 132 associated with the service request 130 and/or another user. The condition 138 can be a condition (e.g., an adverse condition) that reduces a suitability of the vehicle 102 to provide a vehicle service (e.g., to the user 132 and/or another user). For instance, the condition 138 can alter the appropriateness, ability, capability, state, performance, etc. of the vehicle 102 to provide the vehicle services to the user 132 and/or can affect (e.g., negatively) the user's experience with the vehicle 102. The user 132 may identify the condition 138 before and/or after entering the vehicle 102 or receiving a vehicle service from the vehicle 102 (e.g., while riding in the vehicle). In some implementations, the condition 138 can be severe, rendering the vehicle 102 unsuitable to provide the vehicle service to the user 132. For example, before entering the vehicle 102 and/or using the vehicle services (e.g., transportation, courier services), the user 132 may identify that the interior of the vehicle 102 is very unclean to the point that the user 132 would not be willing to ride in the vehicle 102, place a package in the vehicle 102, etc. In some implementations, the condition 138 can be less severe, reducing (but not eliminating) the vehicle's suitability to provide the vehicle service to the user 132. For example, while riding in the vehicle 102, the user 132 may identify that a window of the vehicle 102 is cracked.

The user 132 can provide user input to a user device indicating the existence of the condition. In some implementations, the user 132 can provide user input to a device of the user 132 (e.g., the user's mobile phone). This may be the user device 134 that was used to provide the service request to the operations computing system 104. In some implementations, the user 132 can provide user input to a user device that is associated with the vehicle. Such a user device (e.g., a tablet) can be located in the interior of the vehicle 102 and can be communicatively connected (e.g., physically, wireless) to the vehicle computing system 108. A user device associated with the vehicle 102 can be kept in the interior of the vehicle 102 such that different users of the vehicle 102 may interact with such a user device.

Figure 3:
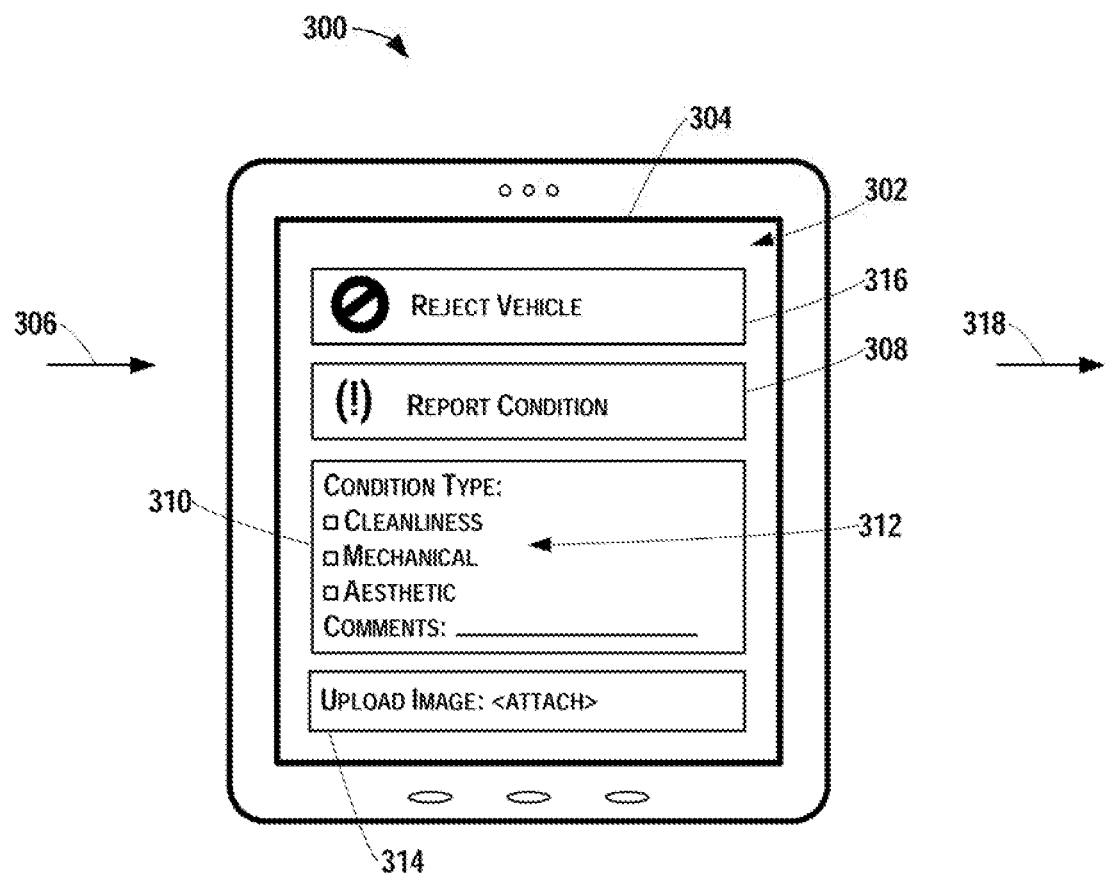
FIG. 3 illustrates an example user device according to example embodiments of the present disclosure.

FIG. 3 illustrates an example user device 300 according to example embodiments of the present disclosure. The user device 300 can be the user device 134 (e.g., mobile user device) associated with the user 132. Such a user device 300 may not be communicatively coupled or otherwise configured to communicate with the vehicle computing system 108. Alternatively, the user device 300 can be a user device associated with the vehicle 102 that is communicatively coupled to the vehicle computing system 108.

The user device 300 can be configured to display a user interface 302 via a display device 304 of the user device 300. The user device 300 can be configured to receive user input 306. User input 306 can be provided via interaction with the user interface 302, voice recognition, gesture recognition, etc. The user input 306 can be indicative of the existence of the condition 138 and/or a rejection of the vehicle 102. For instance, the user 132 can interact with one or more element(s) 308 of the user interface 302 to provide user input 306 indicative of the existence of a condition 138 (e.g., an adverse condition) associated with the vehicle 102. By way of example, the user 132 can interact with element(s) 308 to indicate that the vehicle 102 has a cracked passenger window. Moreover, the user 132 can interact with one or more element(s) 310 of the user interface 302 to provide user input 306 indicative of one or more characteristic(s) 312 associated with the condition 138 (e.g., type, location, suitability of vehicle, or the like). For example, the user 132 can interact with element(s) 310 to indicate that the cracked window is an aesthetic (and/or mechanical issue) located on the right-passenger side of the vehicle 102. In some implementations, the user interface 302 can include one or more element(s) 314 with which the user 132 can interact to include, upload, send, etc. one or more images, videos, illustrations, representations, or the like of the condition 138. For example, the user 132 can capture an image of a cracked window using a camera function of the user device 300.

In some implementations, the user 132 can interact with one or more element(s) 316 of the user interface 302 to provide user input 306 to reject the vehicle 102. For example, the user 132 may desire to reject the vehicle 102 in the event that the condition 138 is particularly severe (e.g., a shattered window significantly reducing the suitability of the vehicle 102 to provide the vehicle service). Accordingly, the user 132 can interact with the element(s) 316 to reject the vehicle 102 such that it will not provide vehicle services to the user 132. In some implementations, the user 132 can reject the vehicle 102 via voice interaction and/or gesture interaction with the user device 300. For example, the user device 300 can be associated with a vehicle 102 and can be configured to receive user input without the user 132 having to enter the vehicle (e.g., outwardly facing from the vehicle). The user 132 can speak into and/or gesture at one or more input device(s) of the user device 300 to provide user input rejecting the vehicle 102.

The user device 300 can be configured to receive the user input 306 (e.g., indicative of the existence of the condition, rejection). The user device 300 can process the user input 306 to generate a communication indicative of the information provided by the user input 306 (e.g., condition existence, characteristics, image). The user device 300 can be configured to send a communication 318 indicative of an existence of the condition 138 associated with the vehicle 102 and/or the other information described herein (e.g., the characteristics of the condition, image of condition, rejection of vehicle, or the like). The user device 300 can send such a communication 318 to the operations computing system 104. In some implementations, in the event that the user device 300 is a user device associated with the vehicle 102, the vehicle computing system 108 may provide the communication 318 indicative of the existence of the condition 138 (e.g., via the communication system(s) 120) to the operations computing system 104.

Returning to FIG. 1, the computing device(s) 128 of the operations computing system 104 can receive, from the user device 300, the communication 318 indicative of the existence of the condition 138 (e.g., adverse condition) associated with the vehicle 102. As indicated above, the condition 138 is identified by a user. The communication 318 indicative of the existence of the condition 138 associated with the vehicle 102 can indicate that the vehicle 102 is not suitable to provide the vehicle service to the user 132. As described above, in some implementations, the communication 318 indicative of the existence of the condition 138 can be a rejection by the user 132 of the vehicle 102 for the vehicle service. The rejection can indicate the user 132 is unwilling to utilize the vehicle 102 for one or more of the vehicle service(s).

The computing device(s) 128 can be configured to determine one or more action(s) to be performed by the vehicle 102 based, at least in part, on the condition 138 associated with the vehicle 102. At least some of the action(s) can attempt to alleviate the condition 138 identified by the user 132. The computing device(s) 128 can be configured to send one or more second control signal(s) 140 to the vehicle 102 to perform one or more of the action(s).

Figure 4:
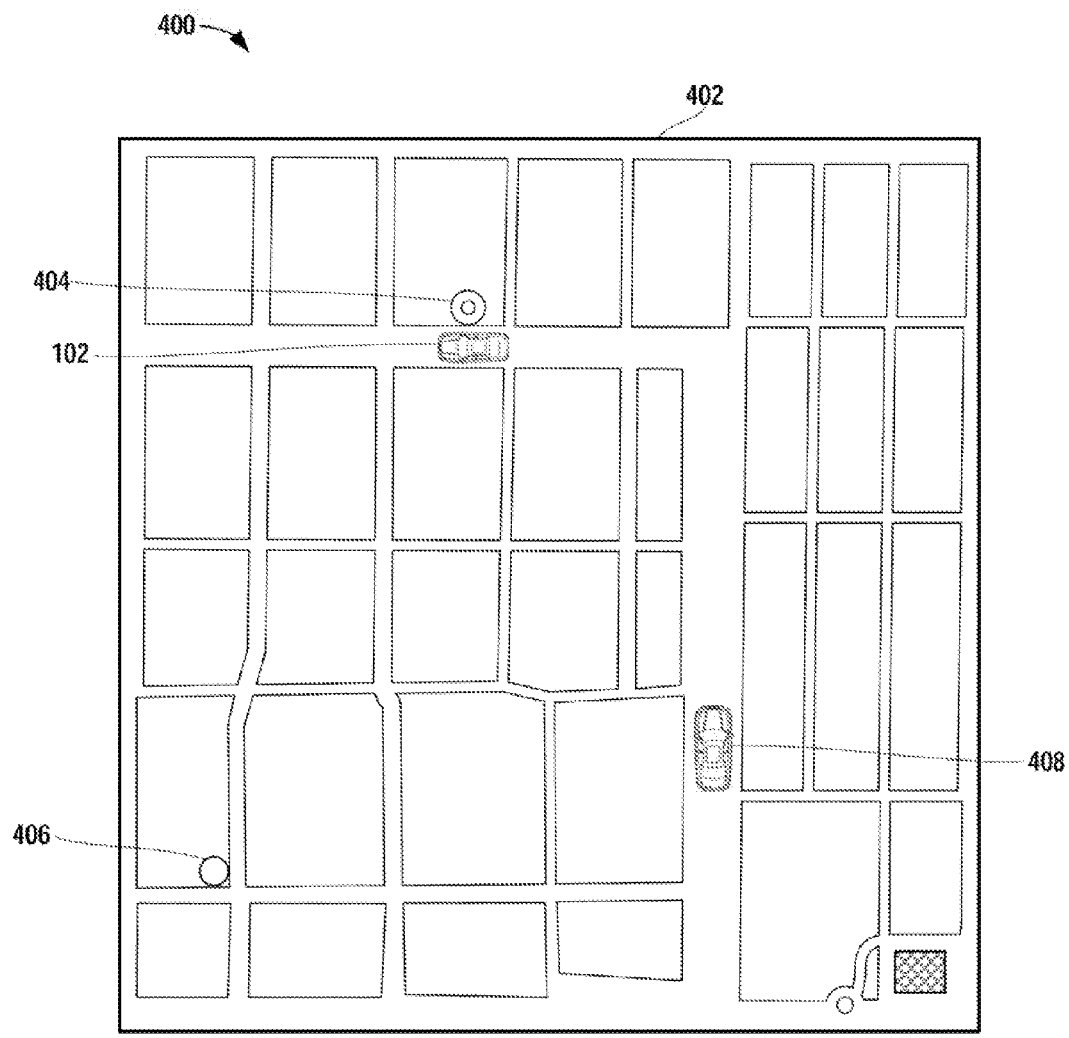
FIG. 4 illustrates a graphical representation of a vehicle in a geographic area according to example embodiments of the present disclosure.

For example, FIG. 4 illustrates a graphical representation 400 of the vehicle 102 in a geographic area 402 according to example embodiments of the present disclosure. The computing device(s) 128 of the operations computing system 104 can receive a service request 130 that is indicative of a location 404 (e.g., associated with a user). The location 404 can be a current and/or future location of the user 132 providing the service request 130 and/or another user. The computing device(s) 128 can provide, to the vehicle 102, one or more first control signal(s) 136 indicating that the vehicle 102 is to travel to the location 404. Before, and/or after, the user 132 enters (and/or otherwise uses) the vehicle 102, the user 132 can identify a condition 138 associated with the vehicle 102.

By way of example, in the event of a severe condition (e.g., very unclean interior) the user 132 can reject the vehicle 102 from providing a vehicle service to the user 132. The computing device(s) 128 can send one or more second control signal(s) 140 to the vehicle to travel to a maintenance location 406 (e.g., service depot) for cleaning. Additionally, or alternatively, the computing device(s) 128 can instruct another vehicle 408 to travel to the location 404 to provide vehicle services to the user 132 (e.g., to transport the user). For instance, the computing device(s) 128 can provide one or more third control signal(s) 142 (e.g., shown in FIG. 1) to another vehicle 408 that is configured to provide the vehicle service. The third control signal(s) 142 can indicate that the other vehicle 408 is to travel to the location 404 associated with the user 132.

In some implementations, the computing device(s) 128 can adjust a service queue to pair the user 132 that rejected the vehicle 102 with another vehicle 408. For instance, as shown in FIG. 5, the computing device(s) 128 can adjust the service queue 200 such that the user 132 (e.g., associated with identifier 204A) is given priority over other users that have not yet been paired with a vehicle. In this way, the computing device(s) 128 can help to expedite the user 132 being provided with the other vehicle 408.

Returning to FIG. 1, in another example, in the event that the condition is less severe (e.g., cracked window), the vehicle 102 may be able to provide one or more of the vehicle service(s) to the user 132 and, afterwards, address the condition 138. In such a case, the computing device(s) 128 can send control signal(s) 136 to cause the vehicle 102 to provide (and/or continue providing) the vehicle services to the user 132 and, then, travel to a maintenance location 406 after completion of the vehicle services (e.g., dropping-off the user 132 and/or a package at a destination location). In some implementations, the computing device(s) 128 can provide a user with a discount on the cost of the vehicle services due to the existence of the condition 138 (e.g., cracked window).

In some implementations, the computing device(s) 128 can determine the one or more action(s) based, at least in part, on a demand (e.g., past, current, future) for the vehicle services. For example, the computing device(s) 128 can determine a volume of service requests for the vehicle service. The volume of service requests can be based, at least in part, on the number of service requests previously received for a time period (e.g., similar time period), currently pending in the service queue 200 (e.g., as in FIG. 2), predicted for a certain time period, etc. The volume of service requests can be indicative of a demand for the vehicle services. The computing device(s) 128 can determine the one or more action(s) to be performed by the vehicle 102 based, at least in part, on the existence of the condition 138 and the volume of service requests for the vehicle service. For example, if the volume of the service requests is high and the condition 138 is minor (e.g., slightly cracked window) such that the vehicle 102 is still capable of providing the vehicle service(s) and/or only slightly less suitable to provide the vehicle services, the computing device(s) 128 can wait to take the vehicle out-of-service. For instance, the computing device(s) 128 can leave the vehicle 102 in a service queue 200 such that it will continue to provide vehicle services to requesting users, despite the existence of the condition 138. Once demand has subsided (and/or is predicted to subside), the computing device(s) 128 can send control signals instructing the vehicle 102 to travel to a maintenance location 406 (e.g., to have the slight crack addressed).

In some implementations, the computing device(s) 128 can be configured to confirm the existence of the condition 138. For instance, in the event that a condition 138 is reported to the computing device(s) 128, the computing device(s) 128 can provide one or more control signal(s) to the vehicle 102 to instruct the image capture device(s) 124 of the vehicle 102 to acquire imagery of the condition 138. The image capture device(s) 124 can acquire image data indicative of the condition 138. The one or more system(s) on-board the vehicle 102 can provide data 144 indicative of the condition 138 to the computing device(s) 128. The computing device(s) 128 can receive the data 144 (e.g., image data) indicative of the condition 138 (e.g., the dirty vehicle interior) from the system(s) on-board the vehicle 102. In some implementations, the computing device(s) 128 can acquire the data 144 in real-time and/or near real-time (e.g., while the user 132 is still accompanying the vehicle 102). In some implementations, a human operator associated with the service provider may communicate with the user 132 (e.g., via the human-machine interface system(s), user device 300) to confirm the existence of the condition 138 (and/or to pacify the user).

Additionally, or alternatively, the computing device(s) 128 can be configured to confirm the existence of the condition 138 based, at least in part, on communication with a user device. For instance, as indicated above, the user 132 can use a user device 300 (e.g., associated with the user 132, associated with the vehicle 102) to acquire imagery of the condition 138 (e.g., cracked window). The user device 300 can provide data 146 (e.g., image data) indicative of the condition 138 to the computing device(s) 128. The data 146 can be included with or separate from the communication 318 (e.g., indicative of the existence of the condition 138). The computing device(s) 128 can receive the data 146 (e.g., image data) indicative of the condition 138 from the user device 300 (e.g., the user's mobile phone, tablet of the vehicle). The computing device(s) 128 can process the data 146 provided by the user device 300 and confirm the existence of the condition 138. In this way, the operations computing system 104 can be configured to determine whether the condition 138 associated with the vehicle 102 does or does not exist. Accordingly, the computing device(s) 128 can filter out false user reports and/or avoid unnecessarily taking a vehicle 102 out-of-service (e.g., out of the available service fleet by sending it to a maintenance location).

The computing device(s) 128 can be configured to reward users for reporting a condition 138 associated with the vehicle 102 and/or penalize users providing false reports. For instance, the computing device(s) 128 can apply a reward (e.g., increase user rating, monetary discount) to a profile associated with the user 132 (e.g., that reported the condition 138) when it is determined that the condition 138 associated with the vehicle 102 does exist (e.g., a window is cracked). The computing device(s) 128 can apply a penalty (e.g., decrease user rating, monetary fine) to a profile associated with the user 132 (e.g., that falsely reported the condition) when it is determined that the condition 138 associated with the vehicle 102 does not exist. Accordingly, the computing device(s) 128 can incentivize accurate reporting of vehicle conditions and disincentivize false reporting.

In some implementations, the user 132 that caused the condition may be penalized, if such a user can be identified. The computing device(s) 128 can determine a user that caused the condition 138 associated with the vehicle 102. For instance, the computing device(s) 128 (and/or an operator associated with the service provider) can review previously captured data (e.g., image data of the interior of the vehicle 102) to determine which user caused the condition associated with the vehicle 102 (e.g., caused the vehicle 102 to become unclean). In the event that such a user is identified, the computing device(s) 128 can apply a penalty to a profile associated with the user that is determined to have caused the condition 138 associated with the autonomous vehicle 102.

Figure 6:
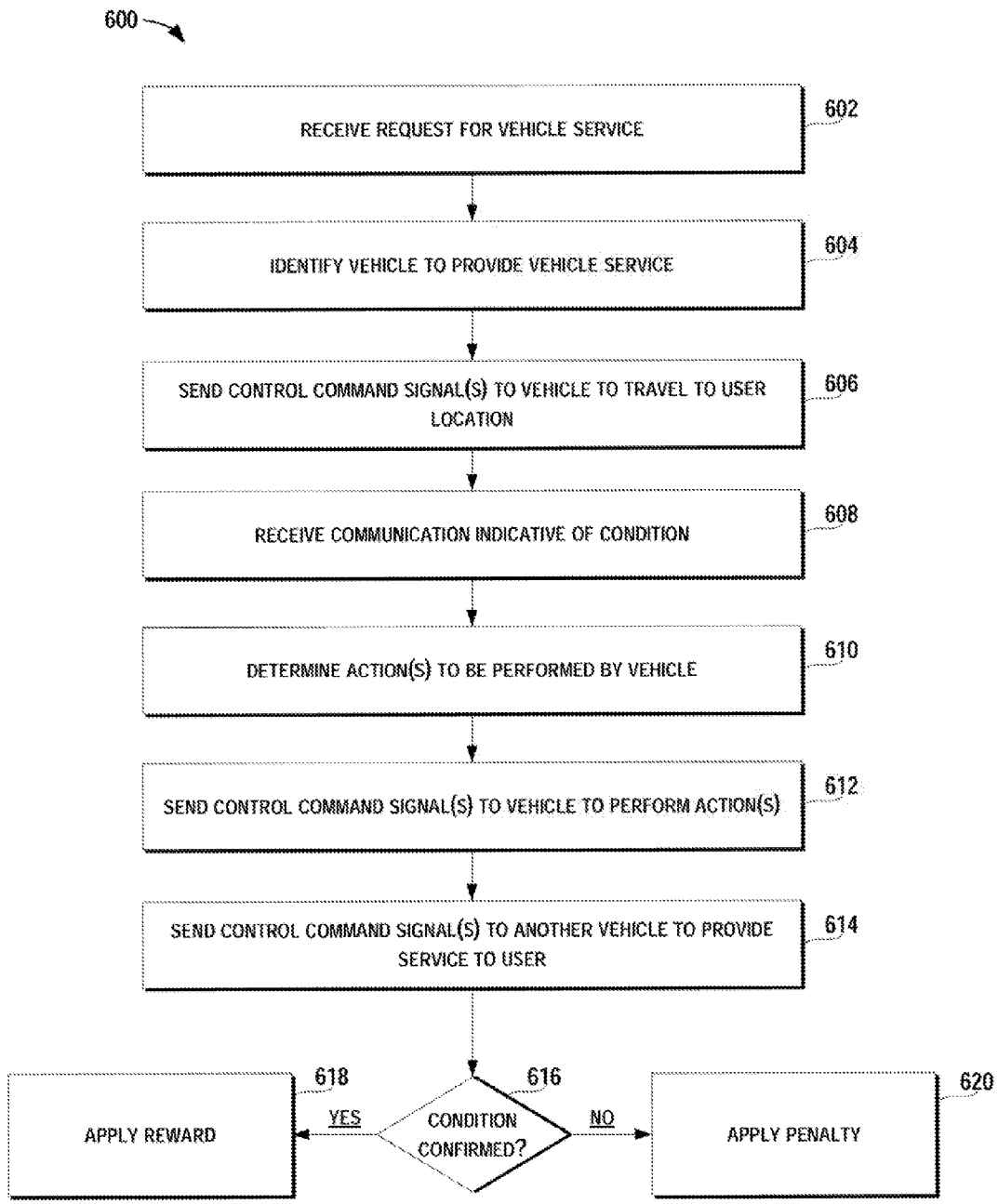
FIG. 6 depicts a flow diagram of an example method of addressing a user-reported vehicle condition according to example embodiments of the present disclosure.

FIG. 6 depicts a flow diagram of an example method 600 of addressing a user-reported vehicle condition according to example embodiments of the present disclosure. One or more portion(s) of the method 600 can be implemented by one or more computing device(s) such as, for example, the computing device(s) 128 shown in FIGS. 1 and 7. Moreover, one or more portion(s) of the method 600 can be implemented as an algorithm on the hardware components of the device(s) described herein (e.g., as in FIGS. 1 and 7) to, for example, address a user-reported vehicle condition. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include receiving a request for a vehicle service. For instance, the one or more computing device(s) 128 can receive a service request 130 for a vehicle service for a user 132. As indicated herein, the service request 130 can be indicative of a location (e.g., 404). By way of example, the vehicle service can be a transportation service and the service request 130 can indicate that the user 132 would like to be picked-up by the vehicle 102 (e.g., an autonomous vehicle) at a current location of the user 132.

At (604), the method 600 can include identifying a vehicle to provide a vehicle service. For instance, the computing device(s) 128 can identify a vehicle 102 to provide the vehicle service to the user 132. The vehicle 102 can be included in a fleet of vehicles of a service provider. As indicated herein, the vehicle 102 can be identified based, at least in part, on a service queue 200 that indicates the vehicles of the fleet that may be available to provide the vehicle service (e.g., the requested transportation service).

At (606), the method 600 can include sending control signal(s) to the vehicle to travel to the location. For instance, the computing device(s) 128 can send one or more first control signal(s) 136 to a vehicle 102 that is configured to provide the vehicle service. The control signal(s) 136 can be provided via one or more network(s) 106. One or more of the first control signal(s) 136 can indicate that the vehicle 102 is to travel to the location 404 (e.g., associated with the user 132). For example, the computing device(s) 128 can send first control signal(s) 136 to the vehicle 102 that was identified to provide the transportation service to the user 132. The vehicle 102 can receive the first control signal(s) 136. Moreover, the vehicle 102 can travel to the location 404 associated with the user 132 to provide the vehicle service (e.g., to pick-up the user 132 for transportation), in accordance with the control signal(s).

At (608), the method 600 can include receiving a communication indicative of a condition associated with the vehicle. For instance, the computing device(s) 128 can receive, from a user device 300, a communication 318 indicative of an existence of a condition 138 associated with the vehicle 102 that reduces a suitability of the vehicle 102 to provide the vehicle service. The condition can be identified by the user 132. As described herein, the user device 300 can be a user device 134 associated with the user 132 (e.g., a mobile phone of the user 132). Alternatively, the user device 300 can be associated with the vehicle 102 (e.g., a tablet that is kept inside the vehicle's interior). The user device associated with the vehicle 102 can be communicatively coupled to the vehicle computing system 108.

The user 132 can use the user device 300 to indicate the existence of the condition 138 associated with the vehicle 102. The user 132 can interact with the user device 300 to provide user input 306 indicative of the condition 138. The user 132 can identify the condition before and/or after entering (or otherwise using) the vehicle 102. By way of example, the user 132 may notice that the vehicle 102 is unclean before entering the vehicle 102. As such, the user 132 may provide user input 306 to the user device 300 indicating that that vehicle 102 is unclean and/or rejecting the vehicle 102. The user device 300 can send a communication 318 to the computing device(s) 128 indicating the existence of the condition and/or the rejection.

In some implementations, the user 132 may enter the vehicle 102 (e.g., before noticing the condition, because he/she is willing to use the vehicle 102 despite the condition). For example, the user 132 can be a current rider of the vehicle 102. The condition 138 can be identified by the user 132 while the user 132 is riding in the vehicle 102 for the transportation service. The condition 138 can be an adverse condition (e.g., uncleanliness) that reduces a suitability of the vehicle 102 to provide the transportation service. To report the condition, the user 132 can interact with the user device 300 (e.g., of the user, of the vehicle) to provide user input 306 indicating that the vehicle 102 is unclean. The user device 300 can send the communication 318 to the computing device(s) 128 to report the condition 138.

At (610), the method 600 can include determining one or more action(s) to be performed by the vehicle. For instance, the computing device(s) 128 can determine one or more action(s) to be performed by the vehicle 102 based, at least in part, on the existence of the condition 138 associated with the vehicle 102. One or more of the action(s) can be to alleviate the condition 138 associated with the vehicle 102. For example, the condition 138 can be less severe (e.g., cracked window) and the user 132 may be willing to use the vehicle 102 for the service. One or more of the action(s) can include the vehicle 102 providing (or continuing to provide) the vehicle service to the user 132 (e.g., transport the user 132 to a destination location). Moreover, one or more of the action(s) can include the vehicle 102 travelling to a maintenance location 406 after providing the vehicle service to the user 132 (e.g., after dropping-off the user 132 at the destination). In this way, the vehicle 102 can provide the vehicle service to the user 132 before being taken out-of-service (e.g., out of the available fleet for maintenance).

In some implementations, at least one of the action(s) can include the vehicle 102 travelling to a maintenance location 406 without providing the vehicle service to the user 132. For example, as described herein, the communication 318 indicative of the existence of the condition 138 can be a rejection by the user 132 of the vehicle 102 for the vehicle service (e.g., transportation). As such, the computing device(s) 128 can determine that the vehicle 102 should travel to a maintenance location 406 without transporting the user 132 to a desired location.

At (612), the method 600 can include providing one or more control signal(s) to the vehicle to perform one or more of the action(s). For instance, the computing device(s) 128 can provide one or more second control signal(s) 140 to the vehicle 102 to perform one or more of the action(s). The vehicle computing system 108 can receive the second control signal(s) 140. The vehicle computing system 108 can execute the action(s) in accordance with the second control signal(s) 140. For example, the vehicle 102 can travel to a maintenance location 406 in response to one or more second control signal(s) 140 indicating such an action.

In some implementations, at (614), the method 600 can include providing control signal(s) to another vehicle to provide a vehicle service to a user. For instance, the computing device(s) 128 can provide one or more third control signal(s) 142 to another vehicle 408 (e.g., another autonomous vehicle) that is configured to provide the vehicle service. One or more of the third control signal(s) 142 can indicate that the other vehicle 408 is to travel to the location 404 associated with the user 132. In this way, the computing device(s) 128 can manage the service provider's fleet of vehicles to provide vehicle services to a user in the event that one or more other vehicle(s) are identified (e.g., by the user) as unsuitable for such a service.

In some implementations, at (616), the method 600 can include confirming the existence of the condition. For instance, the computing device(s) 128 can confirm the existence of the condition 138. As described herein, in some implementations, this can be accomplished via communication with one or more system(s) on-board the vehicle 102 and/or a user device 300. For example, the computing device(s) 128 can receive data 144 indicative of the condition 138 (e.g., dirty interior) from one or more system(s) on-board the vehicle 102. The computing device(s) 128 can confirm the existence of the condition 138 based, at least in part, on the data 144 indicative of the condition 138 from the one or more system(s) on-board the vehicle 102. Additionally, or alternatively, the computing device(s) 128 can receive image data (e.g., photo, video, illustration) indicative of the condition 138 from the user device (e.g., a mobile user device of the user). The computing device(s) 128 can confirm the existence of the condition 138 based, at least in part, on the image data indicative of the condition 138. Additionally, or alternatively, the computing device(s) 128 can receive data indicative of the existence (or lack thereof) of the condition 138 from a user device associated with a maintenance location and/or maintenance worker.

In some implementations, the method 600 can include applying a reward to a user and/or applying a penalty to a user. For example, the computing device(s) 128 can apply a reward at (618) (e.g., monetary reward, discount, increased user rating) to a profile associated with the user 132 when it is confirmed that the condition 138 associated with the vehicle 102 does exist. In some implementations, at (620), the computing devices 128 can apply a penalty to a profile associated with the user 132 when it is determined that the condition 138 associated with the vehicle 102 does not exist (e.g., falsely reported condition). In this way, the service provider can reward and/or penalize users based, at least in part, on the existence of the condition 138.

Figure 7:
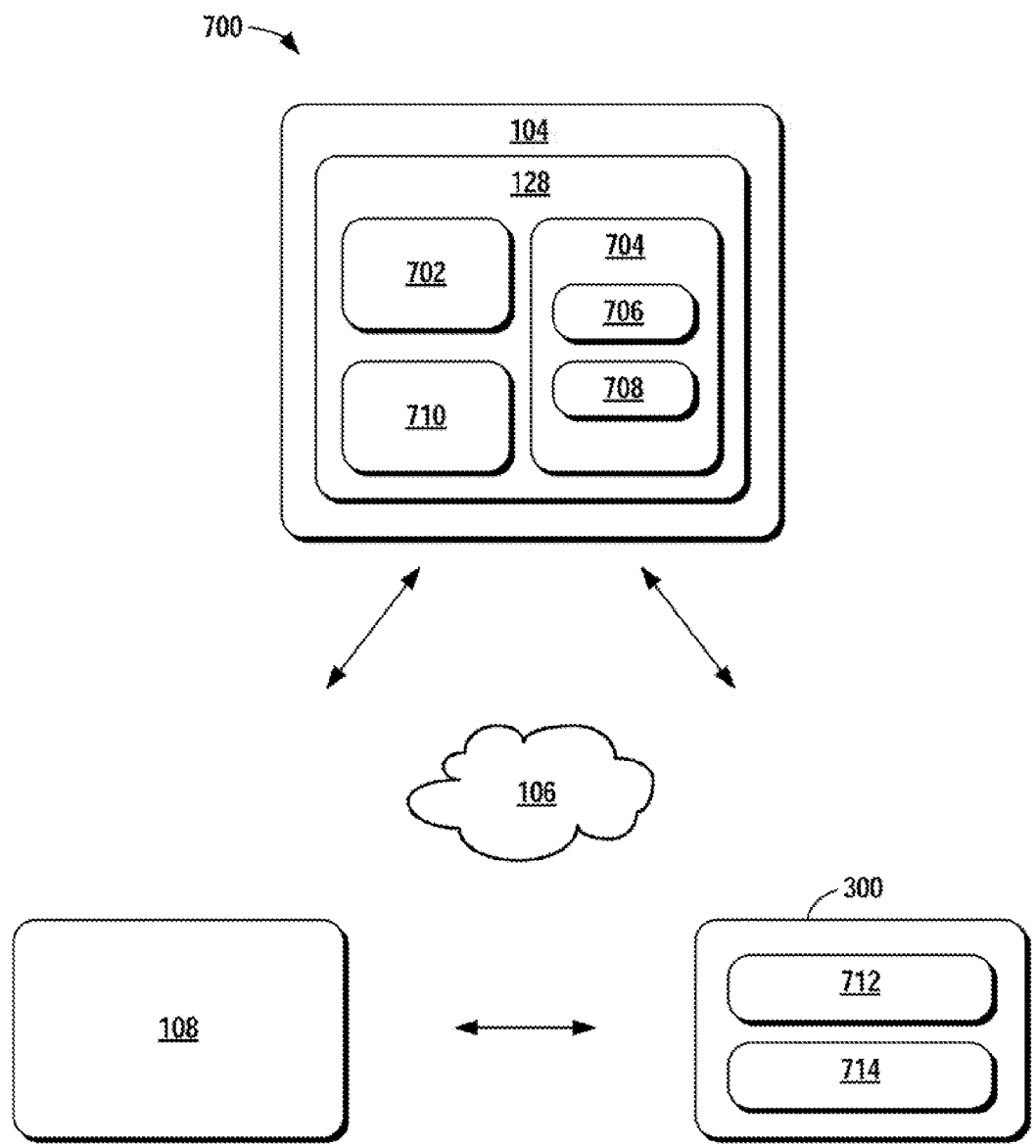
FIG. 7 depicts an example system according to example embodiments of the present disclosure.

FIG. 7 depicts an example system 700 according to example embodiments of the present disclosure. The system 700 can include the operations computing system 104, the vehicle computing system 108 (e.g., located on-board the vehicle 102), and one or more user device(s) 300. The operations computing system 104, the vehicle computing system 108, and one or more user device(s) 300 can be configured to communicate via the one or more network(s) 106 such as those as described herein.

The operations computing system 104 can include the one or more computing device(s) 128. The computing device(s) 128 can include one or more processor(s) 702 and one or more memory device(s) 704. The one or more processor(s) 702 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The processor(s) can be a single processor or a plurality of processors that are operatively and/or selectively connected. The memory device(s) 704 can include one or more non-transitory computer-readable storage media (e.g., storing computer-readable instructions), such as RAM, ROM, EEPROM, EPROM, flash memory devices, magnetic disks, etc., and/or combinations thereof.

The memory device(s) 704 can store information that can be accessed by the one or more processor(s) 702. For instance, the memory device(s) 704 can include computer-readable instructions 706 that can be executed by the one or more processor(s) 702. The instructions 706 can be software written in any suitable programming language or can be implemented in hardware. Additionally, or alternatively, the instructions 706 can be executed in logically and/or virtually separate threads on processor(s) 702. The instructions 706 can be any set of instructions that when executed by the one or more processor(s) 702 cause the one or more processor(s) 702 to perform operations.

For example, the memory device(s) 704 can store instructions 706 that when executed by the one or more processor(s) 702 cause the one or more processor(s) 702 to perform operations such as any of the operations and functions of the computing device(s) 128 or for which the computing device(s) 128 are configured, as described herein, the operations for addressing a user-reported vehicle condition (e.g., one or more portion(s) of method 600), and/or any other operations or functions for addressing a user-reported vehicle condition, as described herein.

The one or more memory device(s) 704 can store data 708 that can be retrieved, manipulated, created, and/or stored by the one or more processor(s) 702. The data 708 can include, for instance, data associated with the fleet of vehicles of the service provider, data associated with a service queue, data associated with one or more service request(s), data associated with a volume of service requests, data associated with one or more user(s), data associated with locations (e.g., of vehicles, users), data associated with control signals, data associated with actions to be performed by a vehicle, data associated with maintenance locations, data associated with a condition, data indicative of user input, data indicative of a confirmation of a condition, data acquired by a system on-board a vehicle and/or a user device, and/or other data or information. The data 708 can be stored in one or more database(s). The one or more database(s) can be split up so that they are located in multiple locales. In some implementations, the computing device(s) 128 can obtain data from one or more memory device(s) that are remote from the computing device(s) 128.

The computing device(s) 128 can also include communication interface 710 used to communicate with the vehicle computing system 108 and/or the user device(s) 300 (e.g., over the network(s) 106). The communication interface 710 can include any suitable components for interfacing with one or more network(s), including for example, transmitters, receivers, ports, controllers, antennas, or other suitable hardware and/or software.

The user device(s) 300 can be various types of computing devices. For example, the user device(s) 300 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The user device(s) 300 can be associated with a user (e.g., 132). The user device(s) 300 can be associated with a vehicle (e.g., 102). For example, the user device(s) 300 described herein can also be representative of a user device that can be included in the human machine interface system of the vehicle 102 (e.g., a user device connected to the vehicle computing system 108).

The user device 300 can also include one or more input device(s) 712 and/or one or more output device(s) 714. In the event that the user device 300 is associated with a vehicle, the input device(s) 712 and/or the output device(s) 714 can be included and/or otherwise associated with one or more human-machine interface system(s) of the vehicle. The input devices 712 can include, for example, hardware for receiving information from a user, such as a touch screen, touch pad, mouse, data entry keys, speakers, a microphone suitable for voice recognition, imaging devices and/or sensors for gesture recognition technology, etc. The output device(s) 714 can include one or more display device(s) (e.g., display screen, CRT, LCD) and/or one or more audio output device(s) (e.g., speakers). The display device(s) and/or the audio output device(s) can be used to facilitate communication with a user. For example, a human operator (e.g., associated with a service provider) can communicate with a current user of a vehicle via at least one of the display device(s) and the audio output device(s).

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing device(s) remote from the vehicle (e.g., the operations computing system and its associated computing device(s)) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of addressing a user-reported vehicle condition, the method comprising:
    receiving, by one or more computing devices, a service request for a vehicle service for a user, wherein the service request is indicative of a location;
    sending, by the one or more computing devices that are remote from an autonomous vehicle, one or more first control signals to the autonomous vehicle that is configured to provide the vehicle service, wherein one or more of the first control signals indicate that the autonomous vehicle is to travel to the location;
    receiving, by the one or more computing devices from a user device, a communication indicative of an existence of a condition associated with the autonomous vehicle that reduces a suitability of the autonomous vehicle to provide the vehicle service, wherein the condition is identified by the user;
    determining, by the one or more computing devices, one or more actions to be performed by the autonomous vehicle based, at least in part, on the existence of the condition associated with the autonomous vehicle;
    sending, by the one or more computing devices, one or more second control signals to the autonomous vehicle to perform one or more of the actions that comprise the autonomous vehicle travelling to receive maintenance associated with the condition; and
    sending, by the one or more computing devices, one or more third control signals to another autonomous vehicle that is configured to provide the vehicle service, wherein one or more of the third control signals indicate that the other autonomous vehicle is to travel to the location.

2. The computer-implemented method of claim 1, wherein one or more of the actions are to alleviate the condition associated with the autonomous vehicle.

3. The computer-implemented method of claim 1, wherein the communication indicative of the existence of the condition is a rejection by the user of the autonomous vehicle for the vehicle service, and wherein at least one of the actions comprises the autonomous vehicle travelling to the maintenance location without providing the vehicle service to the user.

4. The computer-implemented method of claim 1, wherein one or more of the actions comprise providing the vehicle service to the user, and wherein one or more of the actions comprise travelling to the maintenance location after providing the vehicle service to the user.

5. The computer-implemented method of claim 1, further comprising:
    confirming, by the one or more computing devices, the existence of the condition.

6. The computer-implemented method of claim 5, wherein confirming, by the one or more computing devices, the existence of the condition comprises:
    receiving, by the one or more computing devices, data indicative of the condition from one or more systems on-board the autonomous vehicle; and
    confirming, by the one or more computing devices, the existence of the condition based, at least in part, on the data indicative of the condition from the one or more systems on-board the autonomous vehicle.

7. The computer-implemented method of claim 5, wherein the user device is a mobile user device of the user, and wherein confirming, by the one or more computing devices, the existence of the condition comprises:
    receiving, by the one or more computing devices, image data indicative of the condition from the user device; and
    confirming, by the one or more computing devices, the existence of the condition based, at least in part, on the image data indicative of the condition.

8. A system for addressing a user-reported vehicle condition, the system comprising:
    one or more processors that are remote from an autonomous vehicle; and
    one or more memory devices, the one or more memory devices storing instructions that when executed by the one or more processors cause the one or more processors to perform operations, the operations comprising:
    receiving a service request for a vehicle service, wherein the service request is indicative of a location;
    identifying the autonomous vehicle to provide the vehicle service;
    sending one or more first control signals to the autonomous vehicle indicating that the autonomous vehicle is to travel to the location;
    receiving, from a user device, a communication indicative of an existence of a condition associated with the autonomous vehicle, wherein the condition reduces a suitability of the autonomous vehicle to provide the vehicle service, and wherein the condition is identified by a user;
    determining one or more actions to be performed by the autonomous vehicle based, at least in part, on the existence of the condition associated with the autonomous vehicle;
    sending one or more second control signals to the autonomous vehicle to perform one or more of the actions that comprise the autonomous vehicle travelling to receive maintenance associated with the condition; and
    sending one or more third control signals to another autonomous vehicle that is configured to provide the vehicle service, wherein one or more of the third control signals indicate that the other autonomous vehicle is to travel to the location.

9. The system of claim 8, wherein the communication indicative of the existence of the condition associated with the autonomous vehicle indicates that the autonomous vehicle is not suitable to provide the vehicle service to the user.

10. The system of claim 8, wherein the user device is configured to receive, from the user, a user input indicative of the existence of the condition.

11. The system of claim 10, wherein the user device is a mobile device associated with the user, and wherein the user device is configured to display a user interface via a display device of the user device, and wherein the user input is provided via interaction with the user interface.

12. The system of claim 8, wherein the operations further comprise:
   determining a volume of service requests for the vehicle service, and
   wherein one or more of the actions are based at least in part on the existence of the condition and the volume of service requests for the vehicle service.

13. The system of claim 8, wherein the operations further comprise:
   determining whether the condition associated with the autonomous vehicle does or does not exist.

14. The system of claim 13, wherein the operations further comprise:
   applying a reward to a profile associated with the user when it is determined that the condition associated with the autonomous vehicle does exist or a penalty to the profile associated with the user when it is determined that the condition associated with the autonomous vehicle does not exist.

15. The system of claim 13, wherein the operations further comprise:
   determining a user that caused the condition associated with the autonomous vehicle; and
   applying a penalty to a profile associated with the user that is determined to have caused the condition associated with the autonomous vehicle.

16. One or more tangible, non-transitory computer-readable media storing computer-readable instructions that when executed by one or more processors that are remote from an autonomous vehicle cause the one or more processors to perform operations, the operations comprising:
   receiving a service request for a vehicle service for a user;
   identifying the autonomous vehicle to provide the vehicle service to the user, wherein the autonomous vehicle is included in a fleet of vehicles of a service provider;
   receiving, from a user device, a communication indicative of an existence of an adverse condition associated with the autonomous vehicle, wherein the condition is identified by the user;
   determining one or more actions to be performed by the autonomous vehicle based, at least in part, on the existence of the adverse condition associated with the autonomous vehicle;
   sending one or more control signals to the autonomous vehicle to perform one or more of the actions that comprise the autonomous vehicle travelling to receive maintenance associated with the condition; and
   sending one or more other control signals to another autonomous vehicle that is configured to provide the vehicle service, wherein one or more of the third control signals indicate that the other autonomous vehicle is to provide the vehicle service to the user.

17. The one or more tangible, non-transitory computer-readable media of claim 16, wherein the vehicle service is a transportation service, and wherein the adverse condition reduces a suitability of the autonomous vehicle to provide the transportation service.

18. The one or more tangible, non-transitory computer-readable media of claim 17, wherein the user is a current rider of the autonomous vehicle, and wherein the condition is identified by the user while the user is riding in the autonomous vehicle for the transportation service.

19. The one or more tangible, non-transitory computer-readable media of claim 18, wherein the user device is associated with the autonomous vehicle, and wherein the user device is configured to receive user input indicative of the existence of the condition.

20. A computer-implemented method of addressing a user-reported vehicle condition, the method comprising:
   receiving, by one or more computing devices, a service request for a vehicle service for a user, wherein the service request is indicative of a location;
   sending, by the one or more computing devices that are remote from an autonomous vehicle, one or more first control signals to the autonomous vehicle that is configured to provide the vehicle service, wherein one or more of the first control signals indicate that the autonomous vehicle is to travel to the location;
   receiving, by the one or more computing devices from a user device, a communication indicative of an existence of a condition associated with the autonomous vehicle that reduces a suitability of the autonomous vehicle to provide the vehicle service, wherein the condition is identified by the user;
   determining, by the one or more computing devices, one or more actions to be performed by the autonomous vehicle based, at least in part, on the existence of the condition associated with the autonomous vehicle;
   sending, by the one or more computing devices, one or more second control signals to the autonomous vehicle to perform one or more of the actions that comprise the autonomous vehicle travelling to receive maintenance associated with the condition; and
   confirming, by the one or more computing devices, the existence of the condition, wherein the user device is a mobile user device of the user, and wherein confirming, by the one or more computing devices, the existence of the condition comprises
      receiving, by the one or more computing devices, image data indicative of the condition from the user device; and
      confirming, by the one or more computing devices, the existence of the condition based, at least in part, on the image data indicative of the condition.

* * * * *